May 15, 1973     R. DROGIN     3,733,341
STABILIZING THE COLOR OF NEO-CARBOXYLIC ACIDS
Filed Nov. 19, 1968
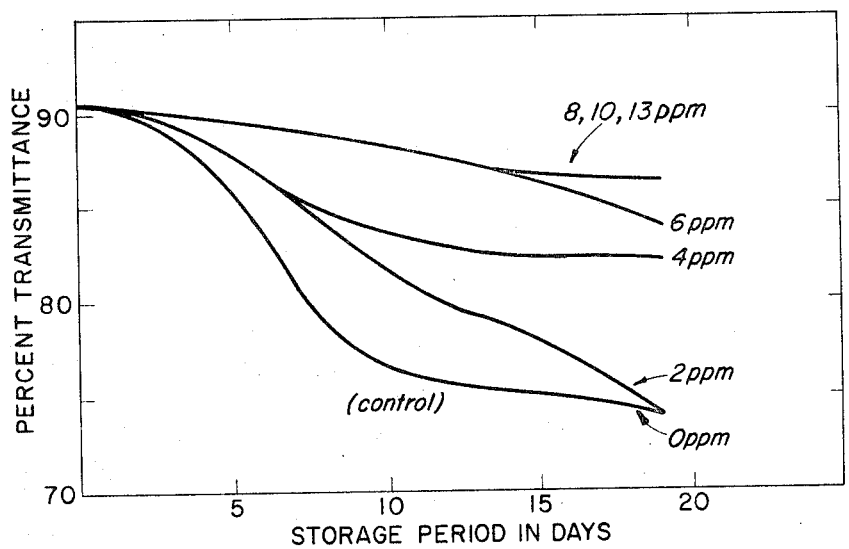
R. Drogin Inventor
By     Attorney 3,733,341
STABILIZING THE COLOR OF NEO-CARBOXYLIC
ACIDS
Robert Drogin, Linden, N.J., assignor to Esso
Research and Engineering Company
Filed Nov. 19, 1968, Ser. No. 776,929
Int. Cl. C11b 5/00
U.S. Cl. 260—398.5
8 Claims

ABSTRACT OF THE DISCLOSURE

The color stability of $C_5$ to $C_{13}$ neo-acids in storage is achieved by the addition of small amounts of a material selected from the group consisting of 2,6-di-tertiary butyl p-cresol, hydroquinone monomethyl ether, 2,6-di-octadecyl p-cresol and p,p'-di-octyl diphenylamine.

BACKGROUND OF THE INVENTION

This invention relates to stabilizing the color of neo-carboxylic acids. More particularly, this invention relates to preventing the discoloration of neo-acid products obtained by the reaction of olefins with carbon monoxide and water in the presence of a boron trifluoride catalyst, e.g., by the Koch synthesis.

Recently, it has been found that branched fatty acids consisting essentially of alpha, alpha' disubstituted saturated monocarboxylic acids (neo-acids) are readily obtained at relatively moderate conditions of temperature and pressure from olefins, carbon monoxide and water with the aid of a catalyst comprising phosphoric acid, boron trifluoride and water, or one comprising a complex hydrate of boron trifluoride and water, e.g., Koch acid synthesis. The alpha, alpha' disubstituted monocarboxylic acids obtained in this low pressure catalytic carboxylic acid synthesis are saturated tertiary monocarboxylic acids hereinafter referred to as neo-acids, having the following general formula:

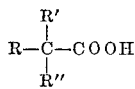

wherein R, R' and R'' are the same or different straight chain or branched chain alkyl groups.

The neo-acids obtained in the above-defined low temperature, catalytic synthesis find application in the production of valuable derivatives therefrom. They are the starting materials in the production of peroxy derivatives which are free-radical initiators, and the salts of the acids with drier metals such as cobalt, manganese, lead, and the like produce paint and varnish driers possessing valuable characteristics. The use of these neo-acids in many fields of application is, however, dependent upon an absence of color in the product acids. The formation of an off-color acid product in storage is inherent in and peculiar to the neo-acids, and is believed to be attributable at least in part to the specific method of their production.

In the production of the crude neo-acid by the above-defined catalytic synthesis, there are obtained in addition to the acid, minor amounts of color-forming impurities including olefins boiling in the same range as the acids, trace metals, polymeric impurities and oxidation by-products. These impurities are collectively referred to as chromogenic impurities. These chromogenes greatly diminish the economic value of the product neo-acids by developing objectionable coloration upon storage or exposure to air and/or sunlight. Attempts made heretofore to isolate a purified acid from the crude neo-acids containing the said chromogenes, for example, by simple distillation, generally results in substantial loss of product. In addition, distillation does not effectively remove all of the chromogenic impurities since a considerable portion of these impurities either co-distill or become entrained with the neo-acid product. Consequently, because of the adverse properties which the inclusion of such chromogenic impurities impart to neo-acids, it is necessary that a method be provided to retard the color degradation of the neo-acids during storage in order to render them more commercially acceptable.

SUMMARY OF THE INVENTION

It has now been discovered that the substantial discoloration occurring in storage of $C_5$ to $C_{13}$ neo-acids may be prevented by the addition of color-stabilizing agents selected from the group consisting of 2,6-di-tertiary butyl p-cresol, hydroquinone monomethyl ether, 2-6-di-octadecyl p-cresol and n,n-dioctyl diphenyl amine. In accordance with the practice of the instant invention, the crude neo-acid made by the above-defined process is distilled in order to separate the light and heavy ends from a heart-cut finished neo-acid product. Thereafter, a color-stabilizing agent of the instant invention is added in an amount ranging from 8 to 100 parts per million (p.p.m.) to effect the color stabilization of the finished neo-acid product.

In a preferred embodiment of this invention it has been further discovered that the addition of an amount as small as 8 parts per mililon (p.p.m.) of 2,6-di-tertiary butyl p-cresol to the finished neo-acid product will effectively stabilize the color of neo-acids during storage. Preferably, the amount of this stabilizing agent added to the distilled neo-acids ranges from about 8 to 15 p.p.m. Higher concentrations of this stabilizer are also effective. Furthermore, it has been found that the addition of from 8 to 15 p.p.m. of 2,6-di-tertiary butyl p-cresol to the finished neo-acid does not have any adverse effect on the end uses of the finished acid in such areas as paint drier formulation.

It has also been discovered that the stabilizing agents of the instant invention are effective in preventing the color degradation of the neo-acids even when short delays occur between the distillation of the crude neo-acids and the addition of the stabilizing agents. Although it is preferred that the stabilizing agents be added to the finished neo-acid product as soon as possible after distillation, delays of relatively short duration can be tolerated.

The stabilizing agents of the instant invention may be employed along or in a binary system with such typical inhibitors as citric acid and trioctylphosphate. However, the use of such binary systems offers no advantage in increasing the color stability of the finished acids, and, in fact, may adversely effect the end uses of the finished acids. Thus, it has been found that a relatively small amount of the specific color-stabilizing agents of the instant invention are effective in preventing the color degradation during storage of the finished neo-acid products.

This invention is further illustrated in great detail by reference to the following examples.

EXAMPLE 1

Neo-decanoic acid was employed in Examples 1 through 7 as a typical neo-acid which exhibits poor color stability during storage. The neo-decanoic acid was obtained by reaction of $C_9$ olefin with carbon monoxide and water in the presence of a boron trifluoride catalyst. The product obtained from the above-described synthesis was an alpha, alpha' disubstituted carboxylic acid, as described above, wherein approximately 30% of the neo-acid product contained methyl groups in the alpha and alpha' position (R' and R" are each methyl groups and R is a $C_7$ isoalkyl radical), approximately 60% of the neo-acid containing one methyl group in the alpha position (R' being a methyl group, R" being an alkyl group containing at least two carbon atoms and R being a $C_2$ to $C_6$ alkyl radical) and approximately 10% of the neo-acid product containing alkyl groups having at least two carbon atoms in the alpha, alpha' positions (R, R' and R" each being selected from the group consisting of $C_2$ to $C_6$ alkyl groups). This neo-acid product was distilled and had a boiling point of 145° to 155° C. at 20 torr and other physical characteristics as shown in Table I.

TABLE I.—COLOR CHARACTERISTICS OF A TYPICAL FINISHED NEO-ACID PRODUCT

| Tests | Glass column | Metal column |
|---|---|---|
| (1) Platinum-cobalt (Pt-Co) color, using ASTM standards in Standard Test D-1209-62 | 30 | 25–30 |
| (2) Percent transmittance at 425μ | 100 | 100 |
| (3) Acid value (MgKOH/g.) | 317 | 317 |
| (4) Iodine value (CgI/g.) | 0.86 | 0.40 |
| (5) Peroxide value (parts per million active oxygen) | 20 | 14 |

This distilled neo-decanoic acid obtained from the above-described synthesis was water-white in color and was then inhibited against color degradation in a simulated plant storage test which approximates the bulk storage of a product neo-acid in the plant. The neo-acid samples were stored in closed brown bottles and placed in an air-circulating oven at 85° F. for 19 weeks. Precautions were taken to exclude air at all times as nitrogen was used to blanket the neo-acid samples. Brown bottles were employed to prevent exposure of the acid samples to light. The results of attempts to prevent the color degradation of the neo-acids with the stabilizers of the instant invention and a number of representative oxidation inhibitors are listed in Table II.

TABLE II.—PLANT STORAGE TEST
Initial color (Pt-Co): 25–30
Temperature (° F.): 85
Storage period (weeks): 19

| Concentration of stabilizer (p.p.m.) | 50 | 100 |
|---|---|---|
| Control | 100 | 100 |
| Citric acid | 40–50 | 40–50 |
| 2,6-ditertiary butyl p-cresol | 40 | 35–40 |
| Hydroxy quinone monomethyl ether | 35 | 35 |
| 2,6 dioctadecyl p-cresol | 35 | 35 |
| n,n-Dioctyl phenyl amine | 35 | 35 |
| 4,4'-methylene bis (2,6-di-tertiary butyl phenol) Ionox 220 | 70 | 70 |
| Polygard (tris nonyl phenol phosphite) | 60 | 60 |
| p-Octyl phenyl salicylate (OPS) | 80–100 | 80–100 |
| Bisphenol A | 50–60 | 50–60 |
| 4-dodecyloxy 2-hydroxyl benzophenone | 100 | 100 |

It can be seen from the data listed in Table II that typical oxidation inhibitors fail to prevent the color-degradation of neo-acids, which is achieved by the instantly claimed compounds.

EXAMPLE 2

The color stabilizers which were effective in preventing the color degradation of the neo-acids from exceeding a platinum cobalt color of 100—a platinum cobalt color of 100 or below being the standard at which it is recognized that a commercially acceptable color stable product has been produced—were then subjected to an accelerated storage test. This test approximates a longer field storage period than the simulated plant storage test described in Example 1. The test was carried out at 120° F. and no care was taken to exclude air. The samples were allowed to breathe so that air was deliberately brought in contact with the neo-acid by removing the samples from the oven periodically and uncapping the bottles. The bottles remained uncapped until the acid reached room temperature. The caps were then replaced and the bottles returned to the oven. The total storage time was 27 days. The results of the neo-acid accelerated storage test reported below in Table III shows that only the specific stabilizing agents of the instant invention are adequate in preventing the color degradation of neo-acids over an extended storage period.

TABLE III.—SCREENING OF NEO-DECANOIC ACID COLOR STABILIZERS (ACCELERATED STORAGE TEST)

| | Pt-Co color of NDA with 50 p.p.m. (inhibitor stored for)— | | | | | Pt-Co color of NDA with 100 p.p.m. (inhibitor stored for)— | | | | |
|---|---|---|---|---|---|---|---|---|---|---|
| Inhibitors | 0 days | 6 days | 11 days | 21 days | 27 days | 0 days | 6 days | 11 days | 21 days | 27 days |
| Control[1] | 100 | 100 | 2 | 2 | 2+ | 100 | 100 | 2 | 2 | 2+ |
| Citric acid | 40–50 | 100 | — | — | — | 40–50 | 100 | — | — | — |
| 2,6-di-tertiary butyl 4-methylphenol | 35–40 | 40–50 | 50–60 | 60 | — | 35–40 | 40–50 | 50–60 | 60 | 60 |
| Hydroxy quinone monomethyl ether | 35 | 40–50 | 50–60 | 60 | 60 | 35 | 40–50 | 60 | 60 | 60 |
| 2,6-dioctadecyl p-cresol | 35 | 40 | 50–60 | 60 | 60 | 35 | 40 | 50–60 | 60 | 60 |
| n,n-Dioctyl phenyl amine | 35 | 40–50 | 60 | 60 | 60 | 35 | 40–50 | 60 | 60 | 60 |
| 4,4'-methylene bis(2,6-di-tertiary butyl phenol) | 70 | 100 | — | — | — | 70 | 100 | — | — | — |
| (Tris nonyl phenol phosphite) | 60 | 80–100 | 100 | — | — | 60 | 80–100 | — | — | — |
| Bisphenol A | 50–60 | 80–100 | 100 | — | — | 50–60 | 80–100 | 100 | — | — |

[1] Color after six days is reported on the Gardner color scale.

NOTE: A dash denotes that sample storage was discontinued as color was above 100 Pt-Co color.

EXAMPLE 3

In this example, 40 p.p.m. of 2,6 - di - tertiary butyl p-cresol were added to neo-decanoic acid and subjected to a rapid aging test, based on the standards of ASTM D–1981–61, a color stability test for fatty acids. This test was used to determine the effect of high temperatures on the color stability of neo-decanoic acid. The test was run at 180° C. for two hours in a constant temperature oil bath. A stream of nitrogen flowing over the acid was used to blanket the sample at all times. After two hours, the platinum cobalt color of the neo-decanoic samples was 100 Pt-Co color. Thus, 2,6-di-tertiary butyl p-cresol is an outstanding stabilizing agent for preventing the color degradation of neo-decanoic acid at high temperature.

EXAMPLE 4

The color stabilizing agents of the instant invention were combined in a binary system with citric acid and trioctylphosphate in order to determine whether a binary stabilizing system would be advantageous over the use of the single color stabilizing agents of this invention. As can be seen from the results tabulated in Table IV below, the use of a binary system of color stabilizing agents offers no advantage over the single color stabilizing agents.

TABLE IV.—STABILIZING AGENTS IN A BINARY SYSTEM

Initial color, Pt-Co: 25-30
Temperature (° F.): 85
Air present: No

| Storage period | 19 weeks | 0 day | 6 days | 11 days | 27 days |
|---|---|---|---|---|---|
| Inhibitor binary system of 50 p.p.m. citric acid with 50 p.p.m. of— | | | | | |
| 2,6-di-tertiary butyl p-cresol | 35 | 35 | 40 | 40-50 | 50-60 |
| Hydroxyquinone monomethyl ether | 35 | 35 | 40-50 | 50 | 50-60 |
| n,n-Dioctyl phenyl amine | 40 | 40 | 40-50 | 50-60 | 50-60 |
| Binary of 50 p.p.m. trioctyl phosphite with 50 p.p.m. of— | | | | | |
| 2,6-di-tertiary butyl p-cresol | 40 | 40 | 50 | 60-70 | 70 |
| Hydroxyquinone monomethyl ether | 40-50 | 40-50 | 50 | 60 | 70 |
| n,n-Dioctyl phenyl amine | 50 | 40-50 | 50 | 70 | 8-100 |

EXAMPLE 5

In order to determine the effect of adding a stabilizing agent after the neo-acid product has been stored for a short period of time, the final neo-acid prepared as in Example 1 was divided into three samples. The first sample was inhibited with 50 p.p.m. of 2,6-ditertiary butyl p-cresol immediately upon the distillation of the crude neo-acid to the final neo-acid product. The second sample was inhibited with 50 p.p.m. of the same color stabilizing agent after four weeks of storage of the distilled neo-acid at room temperature in the absence of air. No color stabilizing agent was added to the third sample. The three samples were subjected to the accelerated storage test as described in Example 2 for two weeks. As the results in Table V indicate, Sample 1, to which the color stabilizing inhibitor was added immediately after distillation, was better in preventing color degradation than was Sample 2. However, it can be seen that both Samples 1 and 2, to which the color stabilizing agent was added, prevents the finished neo-acid product from exceeding 100 Pt-Co color. Thus, although it is preferred that the color stabilizing agents of the instant invention be added as soon as possible after distillation, it does seem that short delays can be tolerated.

EXAMPLE 6

In this example it can be seen that concentration as low as 8 to 15 p.p.m. of 2,6-di-tertiary butyl p-cresol is effective in preventing the color degradation of the neo-acid products. Eight, ten and fifteen p.p.m. of 2,6-ditertiary butyl p-cresol was added to freshly distilled neo-decanoic acid having a 70 to 80 Pt-Co color. The neo-acid sample was then treated in accordance with the accelerated storage test as described in Example 2 for a period of 19 days. As can be seen from the diagram in the figure, a concentration of eight p.p.m. of 2,6-ditertiary butyl p-cresol is effective in stabilizing the finished neo-acid product against color degradation.

EXAMPLE 7

In this example, the advantage of being able to prevent the color degradation of the neo-acids with such a small concentration of a color stabilizing agent of the instant invention allows the treated neo-acids to be used in their usual role as valuable intermediates without adversely affecting the final products produced from said neo-acids, e.g., lead based paint driers and vinyl stabilizers. In a vinyl stabilizing system, cadmium neo-decanoate prepared from neo-decanoic acid containing 25 p.p.m. of 2,6-di-tertiary butyl p-cresol had, in fact, a lighter color (1 versus 2 Gardner) than the salt made from the untreated control. In a test vinyl dry blend formula, both the treated and untreated salts had equivalent heat stabilities. The color and yield of hexyl esters, chosen as representative of a class of compounds that could find use as cosmetic oils, aviation lubricants, plasticizers, etc. prepared from neo-decanoic acid when inhibited with 25 p.p.m. of 2,6-tertiary butyl p-cresol are also equivalent to the freshly distilled untreated control.

In addition, the color of a lead salt paint drier made from neo-decanoic acid treated with 10 p.p.m. of 2,6-di-tertiary butyl p-cresol was equivalent to the untreated control. Drying properties in linseed oil and medium oil alkyd coatings of lead neo-decanoate treated with up to 50 p.p.m. of a color stabilizing agent are equivalent to the untreated lead neo-decanoate and are also equal to commercial lead naphthenates.

While the invention has been described with reference to various examples and embodiments, it will be apparent to those skilled in the art that various modifications may be made without departing from the principles and true nature of the invention, which is intended to be limited only by the scope of the appended claims.

What is claimed is:

1. A composition consisting essentially of a $C_5$ to $C_{13}$ neo-acid product containing chromogenic impurities having admixed therewith from about 8 to about 50 parts per million of a color stabilizing agent selected from the group consisting of 2,6-di-tertiary butyl p-cresol, hydroxyquinone monomethyl ether, 2,6-di-octadecyl p-cresol and p,p'-dioctyl diphenylamine, said color stabilizing agent being effective to substantially retard during storage the color degradation of the neo-acid product.

2. The composition according to claim 1 wherein the chromogenic impurities include olefins boiling in the same range as the neo-acids, trace metals, polymeric impurities and oxidation by-products.

3. The composition of claim 2 wherein the color stabilizing agent is 2,6-di-tertiary butyl p-cresol.

4. The composition according to claim 3 wherein the concentration of said stabilizing agent in the neo-acid product ranges from about 8 to about 15 p.p.m.

5. A composition comprising a $C_5$ to $C_{13}$ neo-acid product formed by reacting a mono-olefinically unsaturated hydrocarbon with carbon monoxide and water in the presence of a boron trifluoride catalyst and thereafter distilling said product to form a finished neo-acid product containing chromogenic impurities having admixed therewith from 8 to about 100 p.p.m. of a color-stabilizing agent selected from the group consisting of hydroxyquinone monomethyl ether, 2,6-di-octadecyl p-cresol and p,p'-dioctyl diphenylamine, said color stabilizing agent being effective to substantially retard the color degradation of said neo-acid product.

6. The composition according to claim 1 wherein the neo-acid is neo-decanoic acid.

7. A composition comprising a $C_5-C_{13}$ finished neo-acid product formed by reacting a mono-olefinically unsaturated hydrocarbon with carbon monoxide and water in the presence of a boron trifluoride catalyst and thereafter distilling said product to form a finished neo-acid product containing chromogenic impurities, and from 8 to about 50 parts per million of a color-stabilizing agent selected from the group consisting of hydroxyquinone monomethyl ether, 2,6 - di - octadecyl p - cresol, and 2,6-di-tertiary butyl p-cresol, said color stabilizing agent being effective to substantially retard during storage the color degradation of the neo-acid product.

8. A composition comprising a $C_5-C_{13}$ finished neo-acid product formed by reacting a mono-olefinically unsaturated hydrocarbon with carbon monoxide and water in the presence of a boron trifluoride catalyst and thereafter distilling said product to form a finished neo-acid product containing chromogenic impurities, and from 8 to about 100 p.p.m. of p,p'-dioctyl diphenylamine, said p,p'-dioctyl diphenylamine being effective to substantially retard the color degradation of said neo-acid product.

(References on following page)

References Cited

UNITED STATES PATENTS 2,828,320   3/1958   Gibson _____ 260—398.5

OTHER REFERENCES

Chem. Abstracts I, vol. 67 (1967), par. 12,838a relied on.

Chem. Abstracts II, vol. 68 (1968), par. 36,565f relied on.

ELBERT L. ROBERTS, Primary Examiner

U.S. Cl. X.R.

260—398.5